Patented May 1, 1945

2,374,843

UNITED STATES PATENT OFFICE 2,374,843

SYNTHETIC RUBBER COMPOUNDING

Albert A. Somerville, Carmel, N. Y., assignor to R. T. Vanderbilt Co. Inc., New York, N. Y., a corporation of New York No Drawing. Application September 27, 1943, Serial No. 504,055

4 Claims. (Cl. 260—42)

My invention relates to improvements in the compounding and vulcanizing of synthetic rubbers produced by copolymerization of butadiene and styrene. This type of synthetic rubber, to which I refer as "synthetic rubber" throughout this specification and in the claims, is illustrated by the product currently designated "GR-S" rubber.

In some respects aging of vulcanized rubber compounds resembles in effect continued curing, that is further vulcanization, of the compound. For example, a natural rubber compound vulcanized for a period less than optimum with an accelerator which is not fugitive under the conditions of vulcanization will, for an initial period, tend to exhibit the same changes in properties as aging progresses that would have been exhibited as the result of longer cures. Thus, a vulcanized rubber compound might be expected to exhibit, for example, increasing hardness and decreasing elongation at break with increasing age.

Natural rubber compounds, however, although following this tendency for a period depending upon the nature of the compound and the conditions of the cure, tend to exhibit, for example, decreasing hardness or a diminishing rate of increase in hardness and increasing elongation at break or a diminishing rate of decrease in elongation at break as aging progresses. This characteristic of vulcanized natural rubber compounds is commonly designated "reversion."

This property of vulcanized natural rubber compounds is of major importance with respect to their utility in a number of applications. This property of natural rubber in compounds vulcanized with so-called "persistent" accelerators, accelerators which exhibit the effect of a continuing cure at a very low rate in the vulcanized compound, permits the production of vulcanized compounds which exhibit extremely stable properties, extreme stability with respect to hardness and elongation at break, for example, over long periods of time. That is, in vulcanized natural rubber compounds which exhibit the property of reversion, persistent accelerators such as mercaptobenzothiazole and benzothiazyldisulphide, for example, can be used to balance this effect and thus to produce a vulcanized product exhibiting a high order of stability for long periods. There are, as might be expected, other accelerators which tend to emphasize reversion, for example, the guanidines and the aldehydeamines and, in compounds containing limited proportions of sulfur, the dithiocarbamates and the thiurams.

Synthetic rubber, however, does not exhibit this property of reversion, and this property is not imparted to vulcanized synthetic rubber compounds by the use of accelerators which tend to emphasize this property if it is originally present. Thus, a vulcanized synthetic rubber compound can be produced which will exhibit optimum properties, or an optimum value for some particular property, for a limited period as aging progresses, but stability for any prolonged period, with respect to hardness and elongation at break, for example, cannot be obtained by the compounding and vulcanizing practices hitherto available. The utility of vulcanized synthetic rubber compounds has been severely limited in many applications by this lack of any means to impart the property of reversion to such compounds.

I have discovered that the property of reversion can be imparted to vulcanized synthetic rubber compounds by including in the compound about 10%–20% by weight on the rubber of an aldolnaphthylamine and particularly aldol-alpha-naphthylamine. My invention comprises vulcanized synthetic rubber compounds comprising about 10%–20% by weight on the rubber of an aldolnaphthylamine, and particularly aldol-alpha-naphthylamine and vulcanizable synthetic rubber compounds of such composition. My invention permits the production of vulcanized synthetic rubber compounds which exhibit, for example, but small increases in hardness over long periods and in which relatively high values for elongation at break are well maintained. This important conjunction of properties has not to my knowledge been previously attained with vulcanized synthetic rubber compounds.

I have no explanation for the result. Aldol-alpha-naphthylamine has been used as an antioxidant in natural rubber compounds for some time, but in natural rubber compounds it exhibits no aging benefit in proportions above about 3%–4% by weight on the rubber and in such larger proportions it exhibits an excessive softening effect in natural rubber compounds. Although GR-S rubber, for example, contains about 2% by weight on the rubber of phenyl-beta-naphthylamine or some similar anti-oxidant as a stabilizer, it does not exhibit the property of reversion. I have also tried large proportions of a number of representative anti-oxidants without securing the improved results of my invention. I have also tried the use of large proportions, separately, of aldol and of naphthylamine without securing comparable results. But I will describe compounding and vulcanizing practices with which I have secured the new results of my invention.

In the following tabulations of compounds, cures and physical properties, the compound of each example was made up of the number of parts by weight indicated opposite each designated component, the cures were in a platen press for periods varying from 15 minutes to 120 minutes as indicated under the temperature of cure, and, for each period of cure, the values for stress at 300% elongation in pounds per square inch appear under "S," for tensile strength in pounds per square inch under "T," for percentage elongation at break under "E," and for Shore hardness under "H." The physical properties for each compound are reported first for the unaged vulcanized compound and second for the vulcanized compound after 24 hours accelerated aging in a hot air oven at 250° F. All of the cures of each group were effected at the same temperature and this temperature is indicated immediately above the designation of the periods of cure constituting each group.

Example I. Also, the compounds containing 10 parts or more of aldolnaphthylamine exhibit unaged a high initial elongation at break which is well maintained in the well cured aged compounds. The values for elongation at break of these compounds after aging are much superior to those for the aged compound containing no aldolnaphthylamine and compare favorably with those for the unaged compound containing no aldolnaphthylamine, comparing Examples III, IV and V with Example I.

|  | Example VI | Example VII |
|---|---|---|
| GR-S rubber | 100 | 100 |
| Zinc oxide | 5 | 5 |
| Stearic acid | 2 | 2 |
| Channel carbon black | 50 | 50 |
| Sulfur | 1.75 | 1.75 |
| Mercaptobenzothiazole | 1.5 | 1.5 |
| Diphenylguanidine | .1 | .1 |
| Aldol-alpha-naphthylamine | ------ | 20 |

|  | Example I | Example II | Example III | Example IV | Example V |
|---|---|---|---|---|---|
| GR-S rubber | 100 | 100 | 100 | 100 | 100 |
| Channel carbon black | 50 | 50 | 50 | 50 | 50 |
| Zinc oxide | 5 | 5 | 5 | 5 | 5 |
| Sulfur | 1.5 | 1.5 | 1.5 | 1.5 | 1.5 |
| Mercaptobenzothiazole | 1.5 | 1.5 | 1.5 | 1.5 | 1.5 |
| Aldol-alpha-naphthylamine | ----- | 5 | 10 | 15 | 20 |

UNAGED

| 293° F.: | S T E H | S T E H | S T E H | S T E H | S T E H |
|---|---|---|---|---|---|
| 15 | 270 480 610 49 | 155 295 840 40 | 145 310 900 50 | 135 320 910 55 | 155 395 1,015 60 |
| 30 | 510 1,145 560 50 | 255 760 800 49 | 235 905 915 51 | 245 920 925 56 | 255 1,015 920 60 |
| 45 | 760 1,650 550 54 | 355 1,035 700 50 | 320 1,265 830 53 | 325 1,230 840 56 | 290 1,335 905 60 |
| 60 | 955 1,820 490 56 | 400 1,410 740 51 | 350 1,515 805 55 | 365 1,520 835 58 | 320 1,525 870 60 |
| 90 | 1,080 2,170 495 59 | 525 1,800 695 54 | 405 1,790 750 56 | 420 1,700 790 58 | 340 1,550 815 61 |

AGED

| 15 | --- 1,665 235 67 | --- 925 205 64 | --- 1,005 235 64 | 1,090 1,250 320 63 | 965 1,415 410 64 |
| 30 | --- 1,565 205 69 | --- 1,110 220 66 | 1,380 1,380 300 65 | 1,060 1,655 440 66 | 870 1,920 570 66 |
| 45 | --- 1,550 195 69 | --- 1,345 255 65 | 1,265 1,725 395 65 | 1,160 1,855 520 66 | 770 1,990 610 66 |
| 60 | --- 1,690 210 70 | 1,645 1,690 210 65 | 1,165 2,080 485 65 | 865 2,140 600 64 | 700 1,920 650 65 |
| 90 | --- 1,920 225 70 | 1,635 1,965 250 64 | 1,060 2,180 550 62 | 790 2,060 630 61 | 615 1,825 690 65 |

The foregoing Examples I to V illustrate the effect of increasing proportions, from zero parts to 20 parts by weight on the rubber, of aldolalphanaphthylamine in a typical synthetic rubber compound. The effect of 5 parts of the aldolnaphthylamine is not particularly significant. But if the values for hardness and elongation at break are compared on the basis of the differences between the values for the unaged samples and for the aged samples as the cure continues, it will be noted that a radical improvement with respect to hardnes is attained and that a satisfactory value for elongation at break is well maintained with the compounds containing 10, 15 and 20 parts of aldoalphanaphthylamine. Specifically, the differences in hardness between the unaged and the aged samples of the compound containing no aldolnaphthylamine in the order of continued cure are 18, 19, 15, 14 and 11, whereas for the compounds containing, respectively, 10, 15 and 20 parts of aldolalphanaphthylamine, these differences in the same order are 14, 14, 12, 10 and 6 in Example III, 8, 10, 10, 6 and 3 in Example IV, and 4, 6, 6, 5 and 4 in Example V. This is a substantial diminution in the rate of increase in hardness upon aging as compared to the compound in which the aldolnaphthylamine is not included,

UNAGED

| 290° F.: | S T E H | S T E H |
|---|---|---|
| 15 | 420 930 610 55 | 350 1,580 800 65 |
| 30 | 740 2,120 600 60 | 420 1,910 770 67 |
| 45 | 1,160 2,620 600 65 | 460 1,960 710 67 |
| 60 | 1,480 2,840 470 65 | 490 2,050 700 67 |

AGED

| 15 | ---- 1,160 130 75 | 1,060 1,430 370 70 |
| 30 | ---- 1,300 130 78 | 920 1,600 460 70 |
| 45 | ---- 1,550 150 78 | 810 1,680 540 69 |
| 60 | ---- 1,490 160 77 | 810 1,570 550 68 |

The foregoing Examples VI and VII illustrate the effect of 20 parts by weight on the rubber of aldolalphanaphthylamine in another typical synthetic rubber compound including a proportion of sulfur somewhat larger than that in the compounds of Examples I to V. As noted below, some increase in the proportion of sulfur appears to be advantageous in compounds including a substantial proportion of an aldolnaphthylamine. This additional sulfur may be effective in satisfying some requirement of the aldolnaphthylamine with respect to the reactions of vulcanization. The addition of sulfur for this purpose, in excess of the sulfur or other vulcanizing agent required for vulcanization of the synthetic rubber, may with advantage approximate 0.3-0.5 part by weight per 20 parts of the aldolnaphthylamine. Comparing Examples VI and VII, the differences in hardness between the unaged and the aged samples of the two compounds, in the order of continued cure, are 20, 18, 13 and 12 for the compound containing no aldolnaphthylamine but are 5, 3, 2 and 1 for the compound containing 20 parts of aldol-curing progresses is markedly better for the compound of Example VII. For example, although the value for elongation at break decreased 450 lbs. with a 45-minute cure and 310 lbs. with a 60-minute cure for the compound of Example VII, it decreased only 170 lbs. and 150 lbs. with the same cures, respectively, for the compound of Example VII, upon aging.

|  | Example VIII | Example IX | Example X | Example XI | Example XII |
|---|---|---|---|---|---|
| GR-S rubber (1) | 100 | 100 | ------ | ------ | ------ |
| GR-S rubber (2) | ------ | ------ | 100 | ------ | ------ |
| GR-S rubber (3) | ------ | ------ | ------ | 100 | ------ |
| GR-S rubber (4) | ------ | ------ | ------ | ------ | 100 |
| Channel carbon black | 50 | 50 | 50 | 50 | 50 |
| Plasticizer | 5 | 5 | 5 | 5 | 5 |
| Zinc oxide | 5 | 5 | 5 | 5 | 5 |
| Sulphur | 2.5 | 2.5 | 2.5 | 2.5 | 2.5 |
| Benzothiazyldisulphide | 1.5 | 1.5 | 1.5 | 1.5 | 1.5 |
| Diphenylguanidine | .25 | .25 | .25 | .25 | .25 |
| Aldol-alpha-naphthylamine | ------ | 20 | 20 | 20 | 20 |

UNAGED

| 290° F.: | S | T | E | H | S | T | E | H | S | T | E | H | S | T | E | H | S | T | E | H |
|---|---|---|---|---|---|---|---|---|---|---|---|---|---|---|---|---|---|---|---|---|
| 15 | 265 | 440 | 520 | 45 | 200 | 980 | 955 | 57 | 440 | 2,140 | 835 | 60 | 310 | 1,760 | 985 | 59 | 290 | 1,430 | 1,000 | 55 |
| 30 | 900 | 1,960 | 505 | 56 | 390 | 1,950 | 815 | 61 | 560 | 2,500 | 745 | 63 | 435 | 2,290 | 840 | 64 | 440 | 2,100 | 840 | 59 |
| 45 | 1,440 | 2,500 | 435 | 62 | 470 | 2,170 | 755 | 63 | 560 | 2,600 | 735 | 63 | 475 | 2,460 | 790 | 64 | 485 | 2,120 | 780 | 60 |
| 60 | 1,850 | 2,280 | 335 | 64 | 505 | 2,290 | 735 | 63 | 580 | 2,570 | 720 | 63 | 460 | 2,500 | 795 | 64 | 510 | 2,130 | 775 | 60 |
| 90 | 2,030 | 2,420 | 335 | 66 | 540 | 2,340 | 720 | 64 | 585 | 2,620 | 725 | 63 | 470 | 2,420 | 775 | 63 | 505 | 2,060 | 750 | 60 |
| 120 | 2,160 | 2,160 | 300 | 67 | 550 | 2,270 | 710 | 64 | 580 | 2,570 | 725 | 63 | 475 | 2,160 | 740 | 62 | 480 | 1,930 | 725 | 60 |

AGED

| | S | T | E | H | S | T | E | H | S | T | E | H | S | T | E | H | S | T | E | H |
|---|---|---|---|---|---|---|---|---|---|---|---|---|---|---|---|---|---|---|---|---|
| 15 | ---- | 1,620 | 160 | 75 | ---- | 1,210 | 220 | 73 | 1,650 | 1,800 | 360 | 74 | ---- | 1,170 | 240 | 72 | ---- | 1,360 | 285 | 70 |
| 30 | ---- | 1,520 | 130 | 79 | ---- | 1,440 | 290 | 73 | 1,490 | 1,850 | 365 | 72 | 1,410 | 1,410 | 300 | 71 | ---- | 1,490 | 345 | 69 |
| 45 | ---- | 1,680 | 135 | 80 | 1,350 | 1,640 | 355 | 72 | 1,350 | 2,220 | 455 | 70 | 1,200 | 1,880 | 430 | 70 | 1,280 | 1,690 | 425 | 68 |
| 60 | ---- | 1,650 | 140 | 80 | 1,160 | 1,990 | 460 | 70 | 1,320 | 2,020 | 435 | 70 | 1,120 | 1,940 | 465 | 70 | 1,240 | 1,780 | 470 | 68 |
| 90 | ---- | 1,920 | 155 | 80 | 1,050 | 1,970 | 490 | 69 | 1,250 | 2,330 | 515 | 69 | 990 | 2,100 | 535 | 69 | 1,050 | 1,840 | 525 | 68 |
| 120 | ---- | 2,040 | 175 | 80 | 950 | 2,020 | 535 | 68 | 1,100 | 2,360 | 540 | 69 | 910 | 2,180 | 580 | 68 | 925 | 1,840 | 530 | 68 | alphanaphthylamine. For each cure, the values for elongation at break are higher for the compound of Example VII, containing 20 parts of aldolalphanaphthylamine, than for the compound of Example VI, and the diminution in the rate of decrease in the elongation at break as The foregoing Examples VIII to XII, show that substantially the same results are secured from the various synthetic rubbers of different producers. Each of the four GR-S rubbers used in the compounds of Examples VIII to XII were secured from different sources.

|  | Example XIII | Example XIV | Example XV | Example XVI |
|---|---|---|---|---|
| GR-S rubber | 100 | 100 | 100 | 100 |
| Channel carbon black | 50 | 50 | 50 | 50 |
| Zinc oxide | 5 | 5 | 5 | 5 |
| Plasticizer | 5 | 5 | 5 | 5 |
| Sulfur | 2.5 | 2.5 | 2.5 | 2.5 |
| Anhydro-formaldehyde-aniline | 1 | 1 | ----- | ----- |
| Tetramethylthiurammonosulphide | .3 | .3 | .5 | .5 |
| Aldol-alpha-naphthylamine | ----- | 20 | ----- | 20 |

UNAGED

| 290° F.: | S | T | E | H | S | T | E | H | S | T | E | H | S | T | E | H |
|---|---|---|---|---|---|---|---|---|---|---|---|---|---|---|---|---|
| 15 | 965 | 2,960 | 580 | 62 | 530 | 2,440 | 705 | 66 | 590 | 2,120 | 610 | 57 | 670 | 2,570 | 640 | 66 |
| 30 | 1,370 | 2,760 | 570 | 64 | 525 | 2,520 | 710 | 66 | 1,520 | 2,550 | 440 | 63 | 690 | 2,530 | 610 | 65 |
| 45 | 1,360 | 2,760 | 555 | 65 | 520 | 2,400 | 695 | 65 | 1,580 | 2,610 | 405 | 65 | 690 | 2,680 | 625 | 65 |
| 60 | 1,390 | 2,660 | 540 | 65 | 515 | 2,420 | 705 | 65 | 1,590 | 2,760 | 380 | 66 | 710 | 2,580 | 620 | 65 |

AGED

| | S | T | E | H | S | T | E | H | S | T | E | H | S | T | E | H |
|---|---|---|---|---|---|---|---|---|---|---|---|---|---|---|---|---|
| 15 | ---- | 1,700 | 230 | 74 | 1,010 | 1,600 | 460 | 73 | ---- | 1,230 | 160 | 72 | 1,220 | 1,460 | 365 | 71 |
| 30 | ---- | 1,370 | 175 | 74 | 880 | 1,510 | 465 | 70 | ---- | 1,170 | 135 | 77 | 1,040 | 1,370 | 375 | 70 |
| 45 | ---- | 1,280 | 180 | 74 | 960 | 1,340 | 450 | 68 | ---- | 1,110 | 140 | 77 | 1,070 | 1,470 | 400 | 70 |
| 60 | ---- | 1,410 | 185 | 74 | 935 | 1,375 | 430 | 69 | ---- | 1,320 | 165 | 77 | 1,070 | 1,360 | 345 | 69 |

|  | Example XVII | Example XVIII | Example XIX | Example XX |
|---|---|---|---|---|
| GR-S rubber | 100 | 100 | 100 | 100 |
| Channel carbon black | 50 | 50 | 50 | 50 |
| Zinc oxide | 5 | 5 | 5 | 5 |
| Plasticizer | 5 | 5 | 5 | 5 |
| Sulphur | 2.5 | 2.5 | 2.5 | 2.5 |
| Tetramethylthiuramdisulphide | .5 | .5 | ----- | ----- |
| Zinc diethyldithiocarbamate | ----- | ----- | .5 | .5 |
| Aldol-alpha-naphthylamine | ----- | 20 | ----- | 20 |

UNAGED

| 290° F.: | S | T | E | H | S | T | E | H | S | T | E | H | S | T | E | H |
|---|---|---|---|---|---|---|---|---|---|---|---|---|---|---|---|---|
| 15 | 980 | 2,610 | 545 | 60 | 590 | 2,360 | 645 | 65 | 470 | 1,370 | 635 | 55 | 460 | 2,260 | 735 | 63 |
| 30 | 1,620 | 2,410 | 445 | 65 | 600 | 2,360 | 615 | 65 | 1,200 | 2,660 | 520 | 63 | 520 | 2,340 | 690 | 64 |
| 45 | 1,810 | 2,380 | 370 | 66 | 610 | 2,370 | 620 | 65 | 1,560 | 2,650 | 450 | 65 | 530 | 2,120 | 630 | 65 |
| 60 | 1,860 | 2,130 | 340 | 66 | 580 | 2,420 | 640 | 65 | 1,550 | 2,690 | 425 | 65 | 520 | 2,060 | 585 | 65 |

AGED

| | S | T | E | H | S | T | E | H | S | T | E | H | S | T | E | H |
|---|---|---|---|---|---|---|---|---|---|---|---|---|---|---|---|---|
| 15 | ---- | 1,130 | 135 | 74 | 1,080 | 1,710 | 345 | 70 | ---- | 1,270 | 170 | 74 | 1,010 | 1,520 | 425 | 70 |
| 30 | ---- | 1,150 | 125 | 76 | 865 | 1,550 | 460 | 69 | ---- | 1,340 | 175 | 75 | 860 | 1,460 | 455 | 68 |
| 45 | ---- | 1,070 | 125 | 77 | 855 | 1,500 | 455 | 68 | ---- | 1,320 | 165 | 74 | 890 | 1,420 | 440 | 67 |
| 60 | ---- | 1,180 | 145 | 77 | 1,000 | 1,490 | 435 | 67 | ---- | 1,250 | 160 | 74 | 1,000 | 1,350 | 400 | 67 |

| | Example XXI | Example XXII | Example XXIII | Example XXIV |
|---|---|---|---|---|
| GR-S rubber | 100 | 100 | 100 | 100 |
| Channel carbon black | 50 | 50 | 50 | 50 |
| Zinc oxide | 5 | 5 | 5 | 5 |
| Plasticizer | 5 | 5 | 5 | 5 |
| Sulphur | 2.5 | 2.5 | 2.5 | 2.5 |
| Benzothiazyl-2-monocyclohexyl sulfenamide | .5 | .5 | 1.5 | 1.5 |
| Lead dimethyldithiocarbamate | ---- | ---- | ---- | ---- |
| Aldol-alpha-napthylamine | ---- | 20 | ---- | 20 |

UNAGED

| 290° F.: | S | T | E | H | S | T | E | H | S | T | E | H | S | T | E | H |
|---|---|---|---|---|---|---|---|---|---|---|---|---|---|---|---|---|
| 15 | 430 | 1,120 | 645 | 51 | 475 | 2,100 | 750 | 63 | 305 | 810 | 630 | 48 | 505 | 2,440 | 730 | 63 |
| 30 | 950 | 2,440 | 545 | 60 | 505 | 2,280 | 700 | 64 | 1,540 | 2,370 | 390 | 63 | 515 | 2,530 | 680 | 64 |
| 45 | 1,270 | 2,410 | 455 | 63 | 490 | 2,390 | 730 | 63 | 1,950 | 2,300 | 330 | 65 | 530 | 2,690 | 680 | 64 |
| 60 | 1,390 | 2,560 | 455 | 65 | 470 | 2,250 | 710 | 62 | 2,080 | 2,290 | 320 | 68 | 580 | 2,640 | 665 | 65 |

AGED

| | S | T | E | H | S | T | E | H | S | T | E | H | S | T | E | H |
|---|---|---|---|---|---|---|---|---|---|---|---|---|---|---|---|---|
| 15 | ---- | 1,830 | 245 | 73 | 985 | 1,675 | 460 | 69 | ---- | 1,060 | 145 | 73 | 1,570 | 1,970 | 245 | 73 |
| 30 | ---- | 1,270 | 150 | 75 | 950 | 1,350 | 410 | 67 | ---- | 1,120 | 125 | 78 | 1,370 | 2,020 | 425 | 72 |
| 45 | ---- | 1,420 | 160 | 75 | 940 | 1,280 | 415 | 66 | ---- | 1,190 | 120 | 78 | 1,250 | 1,920 | 435 | 70 |
| 60 | ---- | 1,320 | 155 | 76 | 880 | 1,420 | 420 | 65 | ---- | 1,260 | 130 | 78 | ---- | 1,260 | 170 | 70 |

| | Example XXV | Example XXVI | Example XXVII | Example XXVIII |
|---|---|---|---|---|
| GR-S rubber | 100 | 100 | 100 | 100 |
| Channel carbon black | 50 | 50 | 50 | 50 |
| Zinc oxide | 5 | 5 | 5 | 5 |
| Plasticizer | 5 | 5 | 5 | 5 |
| Sulfur | 2.5 | 2.5 | ---- | ---- |
| Bis-4-ethylthiazyldisulphide | 1.5 | 1.5 | ---- | ---- |
| Lead phenylaminoethyl phenyl dimethyldithiocarbamate | ---- | ---- | 1.5 | 1.5 |
| Aldol-alpha-naphthylamine | ---- | 20 | ---- | 20 |

UNAGED

| 290° F.: | S | T | E | H | S | T | E | H | S | T | E | H | S | T | E | H |
|---|---|---|---|---|---|---|---|---|---|---|---|---|---|---|---|---|
| 15 | 190 | 480 | 705 | 45 | 250 | 1,120 | 915 | 58 | 1,240 | 2,670 | 480 | 62 | 700 | 2,470 | 610 | 65 |
| 30 | 545 | 1,830 | 645 | 54 | 420 | 2,010 | 795 | 60 | 1,880 | 2,340 | 370 | 67 | 730 | 2,370 | 590 | 65 |
| 45 | 785 | 2,500 | 585 | 60 | 465 | 2,190 | 750 | 63 | 2,130 | 2,160 | 305 | 67 | 685 | 2,130 | 560 | 65 |
| 60 | 1,180 | 2,530 | 455 | 63 | 490 | 2,330 | 710 | 64 | ---- | 2,060 | 290 | 67 | 690 | 2,400 | 605 | 65 |

AGED

| | S | T | E | H | S | T | E | H | S | T | E | H | S | T | E | H |
|---|---|---|---|---|---|---|---|---|---|---|---|---|---|---|---|---|
| 15 | ---- | 1,400 | 160 | 73 | 1,420 | 1,460 | 290 | 71 | ---- | 1,550 | 175 | 75 | 1,170 | 1,450 | 360 | 72 |
| 30 | ---- | 1,310 | 140 | 78 | 1,350 | 1,840 | 400 | 71 | ---- | 1,210 | 135 | 77 | 1,070 | 1,490 | 405 | 70 |
| 45 | ---- | 1,320 | 140 | 78 | 1,350 | 1,940 | 440 | 70 | ---- | 1,200 | 135 | 77 | 1,000 | 1,490 | 420 | 69 |
| 60 | ---- | 1,620 | 160 | 78 | 1,190 | 1,910 | 455 | 70 | ---- | 1,240 | 150 | 77 | 1,060 | 1,320 | 365 | 69 |

The foregoing Examples XIII to XXVIII illustrate the effect of aldolalphanaphthylamine with a variety of representative accelerators and accelerator combinations in a typical synthetic rubber compound. The improved results of my invention are secured with all of these accelerators and accelerator combinations.

| | Example XXIX | Example XXX | Example XXXI | Example XXXII |
|---|---|---|---|---|
| GR-S rubber | 100 | 100 | 100 | 100 |
| Channel carbon black | 50 | 50 | 50 | 50 |
| Zinc oxide | 5 | 5 | 5 | 5 |
| Plasticizer | 5 | 5 | 5 | 5 |
| Sulfur | 2.5 | 2.5 | 2 | 2 |
| Benzothiazyldisulphide | 1.5 | 1.5 | 1.5 | 1.5 |
| Diphenylguanidine | .25 | .25 | .25 | .25 |
| Aldol-alpha-naphthylamine | 20 | ---- | 20 | ---- |
| Aldol-beta-naphthylamine | ---- | 20 | ---- | 20 |

UNAGED

| 290° F.: | S | T | E | H | S | T | E | H | S | T | E | H | S | T | E | H |
|---|---|---|---|---|---|---|---|---|---|---|---|---|---|---|---|---|
| 15 | 480 | 2,460 | 765 | 64 | 430 | 2,050 | 660 | 54 | 525 | 1,740 | 625 | 55 | 435 | 1,930 | 725 | 61 |
| 30 | 645 | 2,800 | 695 | 64 | 475 | 2,190 | 680 | 54 | 1,260 | 2,660 | 475 | 63 | 475 | 2,210 | 725 | 63 |
| 45 | 655 | 2,730 | 655 | 65 | 485 | 2,110 | 680 | 54 | 1,560 | 2,470 | 410 | 63 | 495 | 2,180 | 715 | 63 |
| 60 | 660 | 2,830 | 670 | 64 | 455 | 2,090 | 680 | 55 | 1,700 | 2,470 | 375 | 65 | 495 | 2,190 | 710 | 63 |

AGED

| | S | T | E | H | S | T | E | H | S | T | E | H | S | T | E | H |
|---|---|---|---|---|---|---|---|---|---|---|---|---|---|---|---|---|
| 15 | ---- | 1,405 | 285 | 71 | 1,245 | 1,535 | 350 | 69 | ---- | 1,320 | 145 | 75 | 1,370 | 2,000 | 400 | 72 |
| 30 | 1,460 | 1,695 | 350 | 70 | 1,115 | 1,735 | 430 | 68 | ---- | 1,390 | 130 | 78 | 1,130 | 2,420 | 540 | 70 |
| 45 | 1,370 | 1,605 | 350 | 69 | 1,015 | 1,775 | 460 | 66 | ---- | 1,720 | 170 | 78 | 1,070 | 2,420 | 555 | 70 |
| 60 | 1,350 | 1,610 | 370 | 69 | 990 | 1,795 | 500 | 63 | ---- | 1,690 | 175 | 78 | 890 | 2,370 | 620 | 69 |

| | Example XXXIII | Example XXXIV | Example XXXV | Example XXXVI |
|---|---|---|---|---|
| GR-S rubber | 100 | 100 | 100 | 100 |
| Channel carbon black | 50 | 50 | 50 | 50 |
| Zinc oxide | 5 | 5 | 5 | 5 |
| Plasticizer | 5 | 5 | 5 | 5 |
| Sulfur | 2.5 | 5 | 5 | 5 |
| Benzothiazyldisulphide | 1.5 | 2.5 | 3 | 4 |
| Diphenylguanidine | .25 | 1.5 | 1.5 | 1.5 |
| Aldol-alpha-naphthylamine | 20 | .25 | .25 | .25 |
| | | ---- | 20 | 20 |

UNAGED

| 290° F.: | S | T | E | H | S | T | E | H | S | T | E | H | S | T | E | H |
|---|---|---|---|---|---|---|---|---|---|---|---|---|---|---|---|---|
| 15 | 455 | 2,220 | 750 | 63 | 370 | 1,350 | 665 | 51 | 830 | 2,400 | 610 | 66 | 1,130 | 2,360 | 510 | 68 |
| 30 | 545 | 2,500 | 680 | 64 | 1,020 | 2,580 | 500 | 61 | 900 | 2,300 | 545 | 66 | 1,300 | 2,460 | 465 | 68 |
| 45 | 585 | 2,400 | 670 | 64 | 1,630 | 2,300 | 375 | 63 | 900 | 2,320 | 555 | 66 | 1,330 | 2,440 | 450 | 67 |
| 60 | 555 | 2,530 | 660 | 64 | 2,160 | 2,410 | 310 | 68 | 920 | 2,450 | 545 | 66 | 1,280 | 2,400 | 445 | 67 |

AGED

| | S | T | E | H | S | T | E | H | S | T | E | H | S | T | E | H |
|---|---|---|---|---|---|---|---|---|---|---|---|---|---|---|---|---|
| 15 | 1,600 | 1,760 | 315 | 73 | ---- | 1,490 | 145 | 78 | ---- | 1,710 | 255 | 75 | ---- | 1,650 | 205 | 76 |
| 30 | 1,360 | 2,060 | 415 | 71 | ---- | 1,320 | 115 | 79 | 1,920 | 2,080 | 315 | 75 | ---- | 1,740 | 215 | 75 |
| 45 | 1,200 | 2,180 | 465 | 69 | ---- | 1,260 | 115 | 80 | 1,730 | 2,220 | 365 | 73 | ---- | 1,720 | 235 | 75 |
| 60 | 1,180 | 2,120 | 465 | 69 | ---- | 1,360 | 120 | 80 | 1,640 | 2,330 | 395 | 72 | ---- | 2,100 | 280 | 75 |

The foregoing Examples XXIX and XXX show the general equivalence of aldolalphanaphthylamine and aldolbetanaphthylamine. Aldolalphanaphthylamine appears to be somewhat more effective in diminishing the rate of increase in hardness and aldolbetanaphthylamine appears to be somewhat more effective in diminishing the rate of decrease in elongation at break as aging progresses.

The foregoing Examples XXXI to XXXVI illustrate the effect of variation in the proportion of sulfur. These results may also be compared with those of Examples I to VII in which somewhat lower proportions of sulfur are used. In a compound containing 20 parts by weight of aldol-alphanaphthylamine of rubber, for example, I have found it advantageous to use about 2.5 parts by weight of sulfur although this proportion is somewhat larger than I would ordinarily use in a compound otherwise the same but omitting the aldolalphanaphthylamine.

| | Example XXXVII | Example XXXVIII | Example XXXVIX | Example XL |
|---|---|---|---|---|
| GR-S rubber | 100 | 100 | 100 | 100 |
| Channel carbon black | 60 | 60 | 60 | 60 |
| Zinc oxide | 5 | 5 | 5 | 5 |
| Plasticizer | 5 | 5 | 5 | 5 |
| Sulfur | | | .30 | .30 |
| Mercaptobenzothiazole | 1 | 1 | 1 | 1 |
| Selenium diethyldithiocarbamate | 2 | 2 | 2 | 2 |
| Aldol-alpha-naphthylamine | | 20 | | 20 |

UNAGED

| 290° F.: | S | T | E | H | S | T | E | H | S | T | E | H | S | T | E | H |
|---|---|---|---|---|---|---|---|---|---|---|---|---|---|---|---|---|
| 15 | 730 | 2,400 | 610 | 59 | 370 | 1,185 | 840 | 60 | 1,465 | 2,175 | 395 | 65 | 745 | 2,695 | 620 | 70 |
| 30 | 1,190 | 2,650 | 505 | 62 | 220 | 1,070 | 870 | 61 | ---- | 2,060 | 265 | 68 | 775 | 2,700 | 605 | 70 |
| 45 | 1,190 | 2,440 | 495 | 62 | 230 | 1,010 | 885 | 62 | ---- | 2,000 | 245 | 70 | 840 | 2,650 | 580 | 70 |
| 60 | 1,325 | 2,020 | 450 | 63 | 230 | 920 | 815 | 62 | ---- | 2,000 | 245 | 71 | 820 | 2,720 | 590 | 70 |

AGED

| | S | T | E | H | S | T | E | H | S | T | E | H | S | T | E | H |
|---|---|---|---|---|---|---|---|---|---|---|---|---|---|---|---|---|
| 15 | ---- | 2,360 | 290 | 75 | 825 | 2,000 | 550 | 72 | ---- | 1,530 | 120 | 81 | 1,585 | 2,250 | 385 | 78 |
| 30 | ---- | 1,840 | 220 | 76 | 700 | 1,950 | 610 | 71 | ---- | 1,970 | 155 | 82 | 1,400 | 2,600 | 455 | 78 |
| 45 | ---- | 1,800 | 220 | 75 | 615 | 1,940 | 655 | 71 | ---- | 1,780 | 155 | 82 | 1,325 | 2,700 | 495 | 77 |
| 60 | ---- | 1,480 | 190 | 75 | 600 | 1,820 | 660 | 71 | ---- | 2,050 | 170 | 80 | 1,375 | 2,720 | 490 | 77 |

The foregoing Examples XXXVII to XL illustrate the effect of aldolalphanaphthylamine in so-called "sulfurless" cures of synthetic rubber and also illustrate the advantage of supplying some sulfur in addition to the vulcanizing agent required for vulcanization of the synthetic rubber. The compound of Example XXXVII is representative of the best of compounding practice applicable to GR-S rubber prior to my present invention. The improvement effected by including 20 parts by weight on the rubber of aldolalphanaphthylamine is shown by Example XXXVIII. The further improvement effected by also including 0.3 part by weight on the rubber of sulfur is shown by Example XL. Example XXXIX is given to complete the comparison.

The plasticizer used in the compounds of Example VIII and the following examples is a mixture of 15 parts by weight of a petroleum sulfonate, 5 parts of normal butyl alcohol and 80 parts of a viscous petroleum oil (currently sold under the trade-name "Reogen").

My invention comprises vulcanizable but unvulcanized synthetic rubber compounds comprising about 10%–20% by weight on the rubber of an aldolnaphthylamine and particularly aldolalphanaphthylamine, and the vulcanized products produced by vulcanization of such compounds. Such compounds I believe are the first of vulcanized synthetic rubber compounds to exhibit the important property of reversion in any practical sense.

I claim:

1. A vulcanized butadiene-styrene copolymer synthetic rubber compound comprising about 10%–20% by weight on the rubber of an aldolnaphthylamine.

2. A vulcanized butadiene-styrene copolymer synthetic rubber compound comprising about 10%–20% by weight on the rubber of aldol-alpha-naphthylamine.

3. A vulcanizable butadiene-styrene copolymer synthetic rubber compound comprising about 10%–20% by weight on the rubber of an aldonaphthylamine.

4. A vulcanizable butadiene-styrene copolymer synthetic rubber compound comprising about 10%–20% by weight on the rubber of aldol-alpha-naphthylamine.

ALBERT A. SOMERVILLE.